(12) United States Patent
Tilford

(10) Patent No.: US 7,675,527 B2
(45) Date of Patent: Mar. 9, 2010

(54) MULTISOURCE COMPOSABLE PROJECTION OF TEXT

(75) Inventor: John Sells Tilford, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 478 days.

(21) Appl. No.: 11/698,357

(22) Filed: Jan. 26, 2007

(65) Prior Publication Data

US 2008/0183765 A1 Jul. 31, 2008

(51) Int. Cl.
*G09G 5/00* (2006.01)
*G06T 11/00* (2006.01)

(52) U.S. Cl. .................. 345/619; 345/467; 345/537; 345/545; 345/546; 382/187

(58) Field of Classification Search .......... 345/467, 345/537, 545; 382/187
See application file for complete search history.

(56) References Cited

U.S. PATENT DOCUMENTS

| | | | | |
|---|---|---|---|---|
| 4,521,850 A | * | 6/1985 | Wilhite et al. | 712/200 |
| 5,280,572 A | * | 1/1994 | Case et al. | 369/47.16 |
| 5,548,740 A | * | 8/1996 | Kiyohara | 345/543 |
| 5,781,192 A | * | 7/1998 | Kodimer | 715/770 |
| 6,763,498 B2 | | 7/2004 | Egilsson | |
| 6,836,759 B1 | * | 12/2004 | Williamson et al. | 704/235 |
| 7,058,647 B1 | * | 6/2006 | Hill | 707/102 |
| 7,117,435 B1 | | 10/2006 | Kotler et al. | |
| 2003/0158969 A1 | | 8/2003 | Gimson et al. | |
| 2003/0237046 A1 | | 12/2003 | Parker et al. | |
| 2004/0236754 A1 | | 11/2004 | Workman et al. | |
| 2005/0132266 A1 | | 6/2005 | Ambrosino et al. | |
| 2006/0075323 A1 | | 4/2006 | Singh et al. | |
| 2006/0235811 A1 | | 10/2006 | Fairweather | |

OTHER PUBLICATIONS

Kamina, et al., "Embedding XML Processing Toolkit on General Purpose Programming Language", Date: Dec. 4-6, 2002, pp. 159-166, http://ieeexplore.ieee.org/search/srchabstract.jsp?arnumber=1182985&isnumber=26540&punumber=8424&k2dockey=1182985@ieeecnfs&query=%28+%28+embed*%3Cin%3Eab+%29+%3Cand%3E+%28+%7E%7Eprogramming+language%7E%7E%3Cin%3Emetadata+%29+%29%3Cand%3E+%28+dynamic*%3Cin%3Emetadata+%29&pos=0.

Thirunarayan Krishnaprasad "On Embedding Machine-Processable Semantics into Documents", Date: Jul. 2005, pp. 1014-1018, vol. 17, Issue: 7, http://ieeexplore.ieee.org/search/srchabstract.jsp?arnumber=1432709&isnumber=30889&punumber=69&k2dockey=1432709@ieeejrns&query=%28+%28+embed*%3Cin%3Eab+%29+%3Cand%3E+%28+%7E%7Eprogramming+language%7E%7E%3Cin%3Emetadata+%29+%29%3Cand%3E+%28+xml%3Cin%3Emetadata+%29&pos=1.

* cited by examiner

*Primary Examiner*—M Good Johnson
(74) *Attorney, Agent, or Firm*—Capitol City TechLaw; Richard C. Irving

(57) ABSTRACT

Embodiments consistent with the subject matter of this disclosure may transparently project text fragments from one or more buffers into one or more projection buffers by reference, instead of by copying. Clients or applications, such as, for example, compilers, language services, an editor's rendering system, or other client or application, may transparently process the projected text fragments projected into the projection buffers as if processing simple text files. In some embodiments, text of a first language, embedded in a document having text of one or more other languages, may be projected to a projection buffer and provided to an application, which may process text of the first language. In other embodiments, text may be elided from a document by projecting to a projection buffer only text not to be elided from the document.

19 Claims, 8 Drawing Sheets

MULTISOURCE COMPOSABLE PROJECTION OF TEXT

BACKGROUND

State-of-the-art program editors impose a demanding set of requirements with respect to presentation of text and visual adornments, such as, for example, automatic completion of a word being entered (autocompletion), or other adornments, that enrich text. In some situations it may be desirable to display only a subset of a text file, and/or to combine text from multiple files. Further, programming language text in one programming language may be embedded within text written in a different programming language.

In existing program editors multiple copies or partial copies of the program text may be made, such that, for example, a partial copy of text, including embedded programming language text, may be processed by a compiler or other development tool, or text from multiple files may be copied into a single file and processed by a development tool. However, when using this approach, software developers may have more difficulty implementing clients because the clients must be aware of the copies of the text and relationships among the copies. Further, maintaining consistency among the copies of text may become burdensome and complicated.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

A text buffer may be a software object which stores a sequence of characters or text, such as, for example, text of a document of interest to an application, or other text. A projection buffer is a type of text buffer. In embodiments consistent with the subject matter of this disclosure, text from one or more text buffers may be transparently projected to one or more projection buffers by reference, rather than by maintaining a separate copy of the text. In various embodiments, text projected from multiple sources into a projection buffer may appear to a client or application as if the text is composed in a single buffer.

In some embodiments, text of a first programming language, embedded in a document including text of one or more other programming languages, may be projected from a buffer to a projection buffer. The projected text of the projection buffer may then be provided to a client or application for processing. Output of the processing may include visual adornments, which may be output to the projection buffer, and subsequently, may be provided to the buffer from which the text was projected.

In other embodiments, portions of a document may be elided before processing by a client or application by projecting only portions of the document that are not to be elided to a projection buffer. The projected portions of the projection buffer may then be provided to the client or application for processing.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

Exemplary Processing Device

Figure 1:
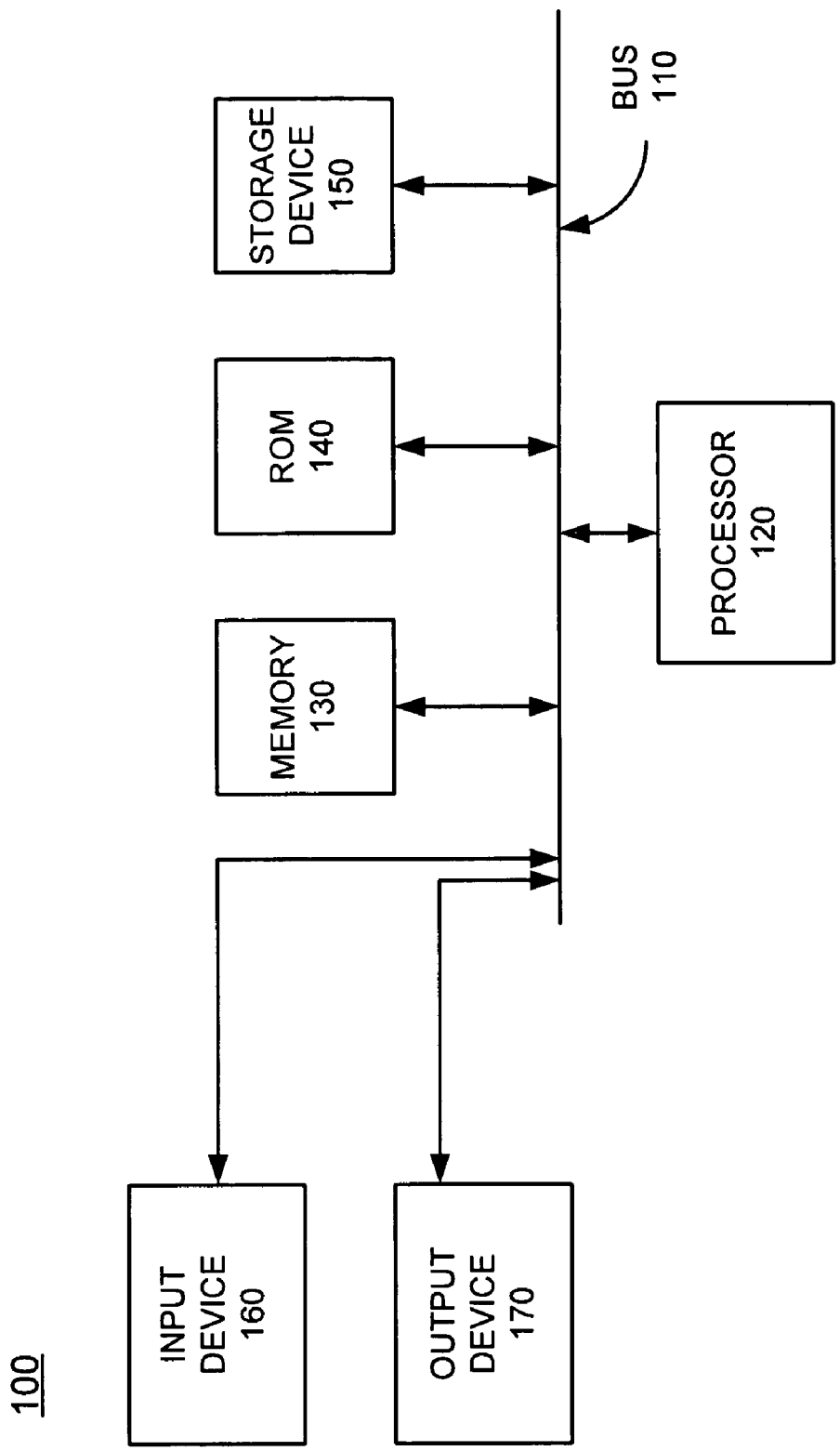
FIG. 1 is a functional block diagram illustrating an exemplary processing device, which may be used in implementations consistent with the subject matter of this disclosure.

FIG. 1 is a functional block diagram that illustrates an exemplary processing device 100, which may be used in implementations consistent with the subject matter of this disclosure. Processing device 100 may include a bus 110, a processor 120, a memory 130, a read only memory (ROM) 140, a storage device 150, an input device 160, and an output device 170. Bus 110 may permit communication among components of processing device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media for storing data and/or instructions.

Input device 160 may include one or more conventional mechanisms that permit a user to input information to processing device 100, such as, for example, a keyboard, a mouse, or other input device. Output device 170 may include one or more conventional mechanisms that output information to the user, including a display, a printer, or other output device.

Processing device 100 may perform such functions in response to processor 120 executing sequences of instructions contained in a tangible machine-readable medium, such as, for example, memory 130, or other medium. Such instructions may be read into memory 130 from another tangible machine-readable medium, such as storage device 150.

Overview

Projection buffers address the above-mentioned problems of the state-of-the-art program editors. Embodiments consistent with the subject matter of this disclosure may employ projection buffers to transparently project text fragments from one or more buffers into one or more projection buffers by reference, rather than by maintaining copies of the text fragments. In various embodiments, composition of the projected text fragments may be supported. Clients, such as, for example, compilers, authoring assistance tools, an editor's rendering system, or other client may transparently process the projected text fragments in projection buffers as if processing simple text buffers. This approach permits, for example, projection of embedded programming language text within a document to a projection buffer for processing by a development tool, such as, for example, compilers or authoring assistance tools, without maintaining multiple copies of the projected text.

Projection Buffers

A text buffer may contain text of a document of interest to an application. In implementations consistent with the subject matter of this disclosure, the text buffer may be a software object which may store a sequence of characters, or text. Through an application program interface (API), the text buffer may permit a client to extract all or part of stored text, to modify the stored text, and to register to receive notifications when the stored text is changed by any client.

A text span is a software object which may describe a contiguous sequence of characters in a text buffer. The text span may describe the text buffer, a position of a first character in a sequence within the text buffer, and a length of the sequence (in characters).

A text editor is an application which may employ a text buffer for holding text that the text editor displays on a screen. A compiler is an application that uses use a text buffer to hold text that the compiler may compile into machine code, and/or for which the compiler may offer authoring assistance, or other assistance.

A projection buffer is a type of text buffer. However, the projection buffer does not store any text. Instead, the projection buffer may be specified by an ordered sequence of text spans, known as source spans. The projection buffer may present a concatenation of multiple source spans as a contiguous sequence of characters. Source buffers are text buffers from which the source spans are drawn. When a client requests a sequence of characters from a projection buffer, the projection buffer may map the request to one or more requests of source buffers, may concatenate a result of the mapping, and may return a single sequence of characters to the requesting client. When a client inserts one or more characters into a projection buffer, the projection buffer may map one or more insertion positions to one or more source buffers and may perform the insertion into the one or more source buffers, instead of into the projection buffer. When a client deletes one or more characters from a projection buffer, the projection buffer may map one or more positions of the one or more deleted characters to one or more source buffers and may perform deletions on the one or more source buffers, instead of the projection buffer. When text in a source buffer is changed, a projection buffer may receive a change notification from the source buffer, and may map the change notification into a corresponding change notification on the projection buffer. The mapped change notification may be provided to a client registered to receive notifications when text of the projection buffer is changed. Thus, the client views the projection buffer as if the projection buffer stores the projected text.

Figure 2:
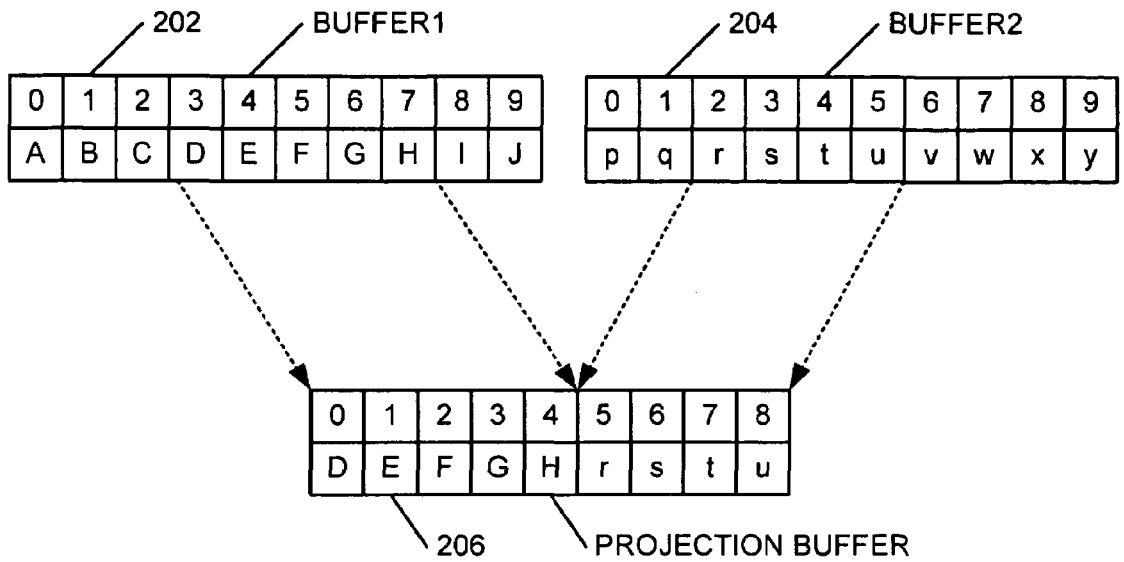
FIG. 2 illustrates an example in which text from multiple buffers are projected to a projection buffer.

FIG. 2 illustrates an exemplary use of a projection buffer. In this example, buffer1 202 and buffer2 204 are source buffers having textual content. Buffer1 202 includes 10 text characters, A-J, in positions 0-9. Buffer2 204 includes 10 text characters, p-y, in positions 0-9. In this example, projection buffer 206 is formed from two source spans. The first source span includes positions 3-7 of buffer1 202. The second source span includes positions 2-5 of buffer2 204.

FIG. 2 shows contents of projection buffer 206 as it would appear to a client. That is, in this example, when a client requests a sequence of characters from projection buffer 206, projection buffer 206 may map the request to a request of source buffer, buffer1 202 and a request of source buffer, buffer2 204, may concatenate a result of the mapping, and may return a single sequence of characters to the client. In this example, the client would receive a sequence of characters including text characters, D-H, corresponding to positions 0-4 of projection buffer 206, and text characters, r-u, corresponding to positions 5-8 of projection buffer 206. Projection buffer 206 may not actually store any of the projected text. Instead, projection buffer 206 may store a list of one or more source spans.

Figure 3:
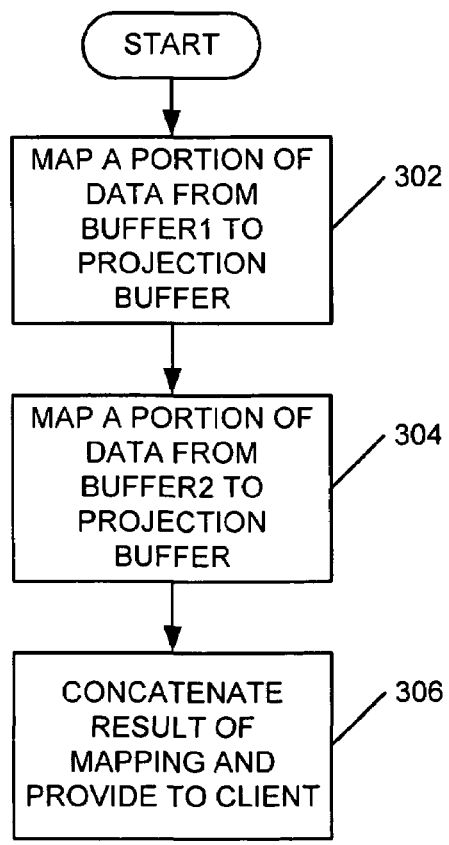
FIG. 3 is a flowchart illustrating an exemplary process for projecting a portion of content from multiple buffers to a projection buffer.

FIG. 3 is a flowchart that explains an exemplary process for projecting a portion of content of buffer1 202 and buffer2 204 to projection buffer 206, with respect to the example of FIG. 2, when a client requests a sequence of characters from projection buffer 206. The process may begin by projection buffer 206 mapping the request to a request for a portion of data, such as, for example, text, from buffer1 202 (act 302). That is, a text span which describes a span of buffer1 202, beginning at position 3 and extending for a length of five positions, may be added to an ordered list of source spans included in projection buffer 206. Next, projection buffer 206 may map the request for a next sequence of characters from projection buffer 206 to a request for a portion of data, such as, for example text, from buffer2 204 (act 304). That is, a text span which describes a span of buffer2 204, beginning at position 2 and extending for a length of five positions, may be added to an ordered list of source spans included in projection buffer 206. Projection buffer 206 may concatenate a result of the mapping and may provide the requesting client with a single sequence of characters. The requesting client may be an application, such as, for example, a development tool, including but not limited to, a compiler, authoring assistance tools, an editor, or other application.

With respect to the example of FIG. 2, a client that requests a text string from projection buffer 206 beginning at position 3 and extending for four characters may receive a value "GHrs". To provide the client with the value "GHrs", projection buffer 206 may map span [3 . . . 6] of projection buffer 206 into span [6 . . . 7] of buffer1 202 and span [2 . . . 3] from buffer2 204. Projection buffer 206 may then extract text from buffer1 202 and buffer2 204 and return the concatenation of the extracted text.

Figure 4:
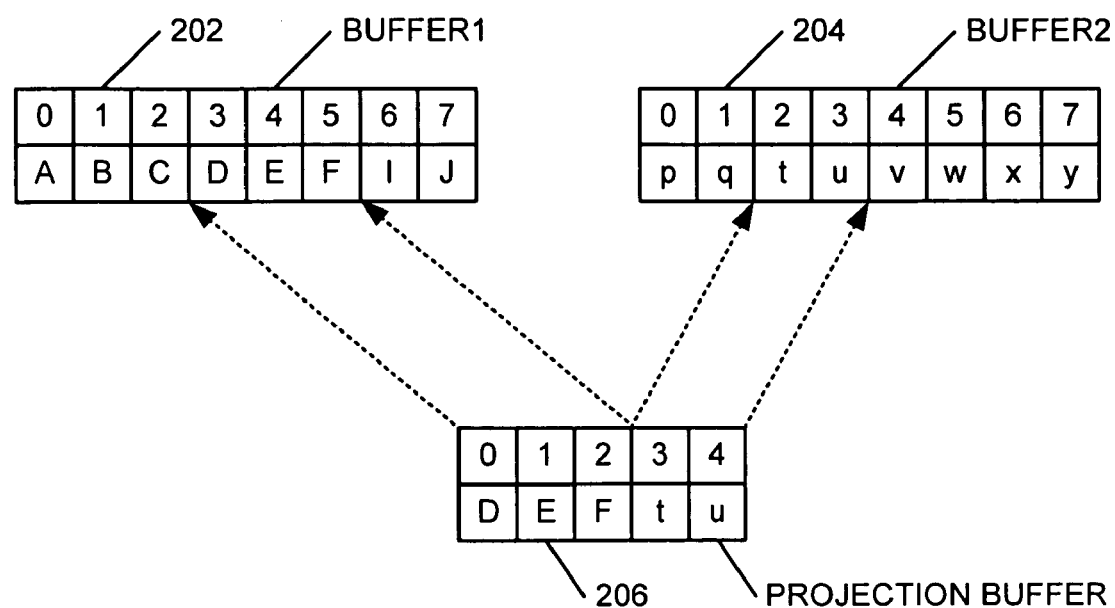
FIG. 4 illustrates an example in which text is deleted from a projection buffer, with the deletion be mapped to corresponding buffers from which the text was projected.
Figure 5:
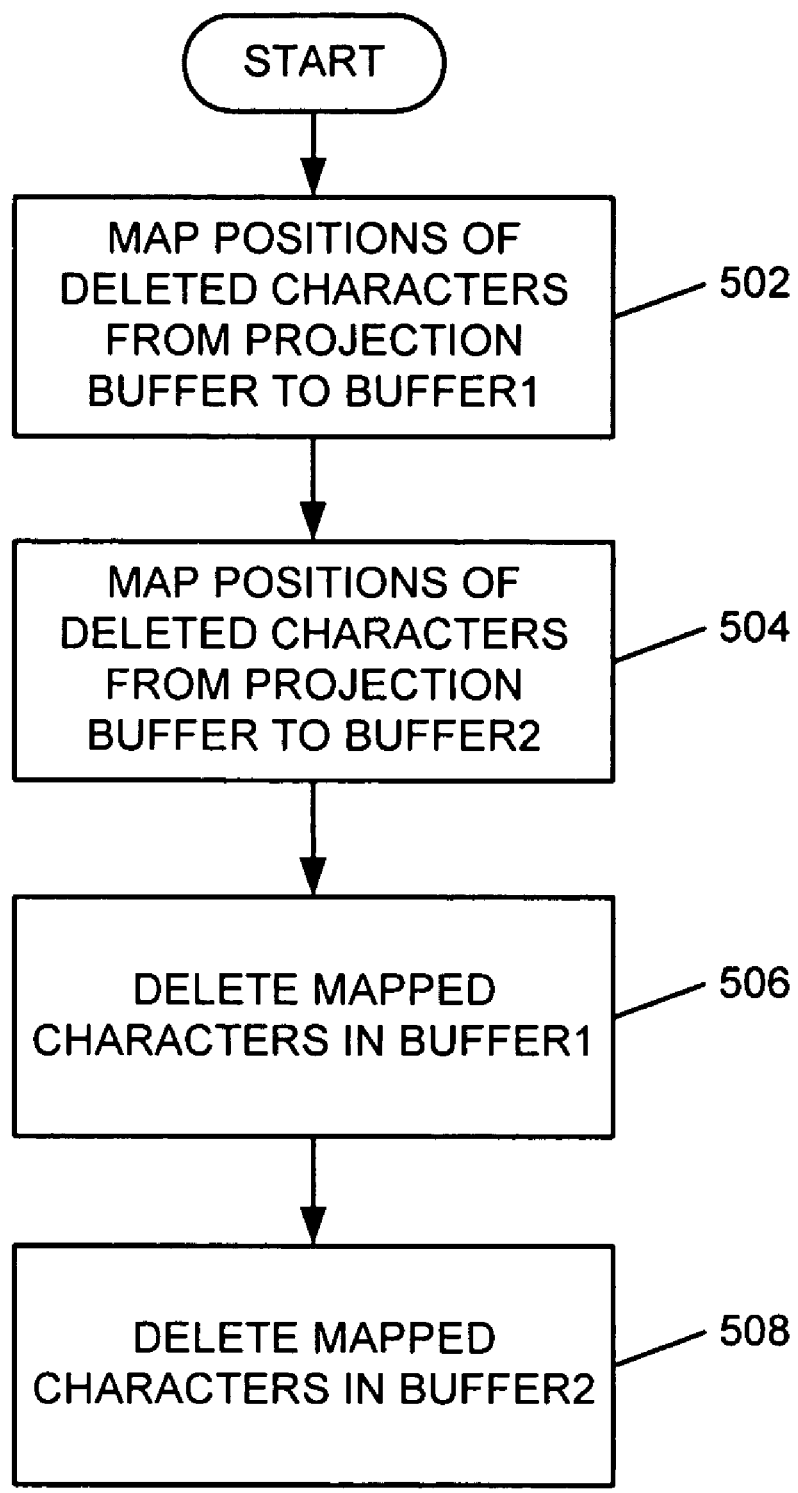
FIG. 5 is a flowchart that illustrates an exemplary process for deleting text from a projection buffer and mapping the deletion of the text to corresponding buffers from which the text was projected.

FIG. 4, with reference to an exemplary flowchart of FIG. 5, illustrates an example in which text is deleted from projection buffer 206 by a client. In this example, the client may issue a request to projection buffer 206 to delete characters from positions 3-6 of projection buffer 206.

The process may begin with projection buffer 206 (FIG. 2) mapping positions of the deleted characters from positions 3-4 of projection buffer 206 (FIG. 2) to positions 6-7 of source buffer, buffer1 202 (FIG. 2) (act 502). Next, projection buffer 206 may map positions of the deleted characters from positions 5-6 of projection buffer 206 (FIG. 2) to positions 2-3 of source buffer, buffer2 204 (see FIG. 2) (act 504). Next, the mapped characters in source buffer, buffer1 202, may be deleted (act 506). The source span that previously denoted positions 3-7 in source buffer, buffer1 202, now denotes positions 3-5 in that buffer. Finally, the mapped characters in source buffer, buffer2 204, may be deleted (act 508). Characters originally from positions 4 and 5 of buffer2 204 may now occupy positions 2 and 3, respectively, of buffer2 204. The source span that previously denoted positions 2-5 in source buffer, buffer2 204, now may denote positions 2-3 in source buffer 204. The result is shown in FIG. 4.

Figure 6:
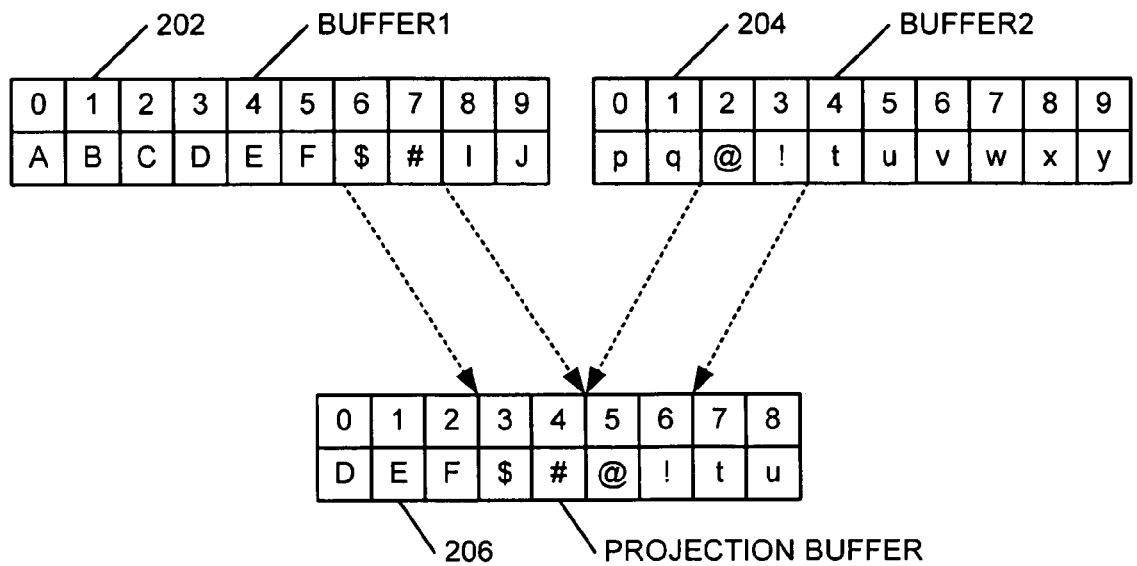
FIG. 6 illustrates an example in which text is changed in a projection buffer, with the change being a mapped to corresponding buffers from which the text was projected.
Figure 7:
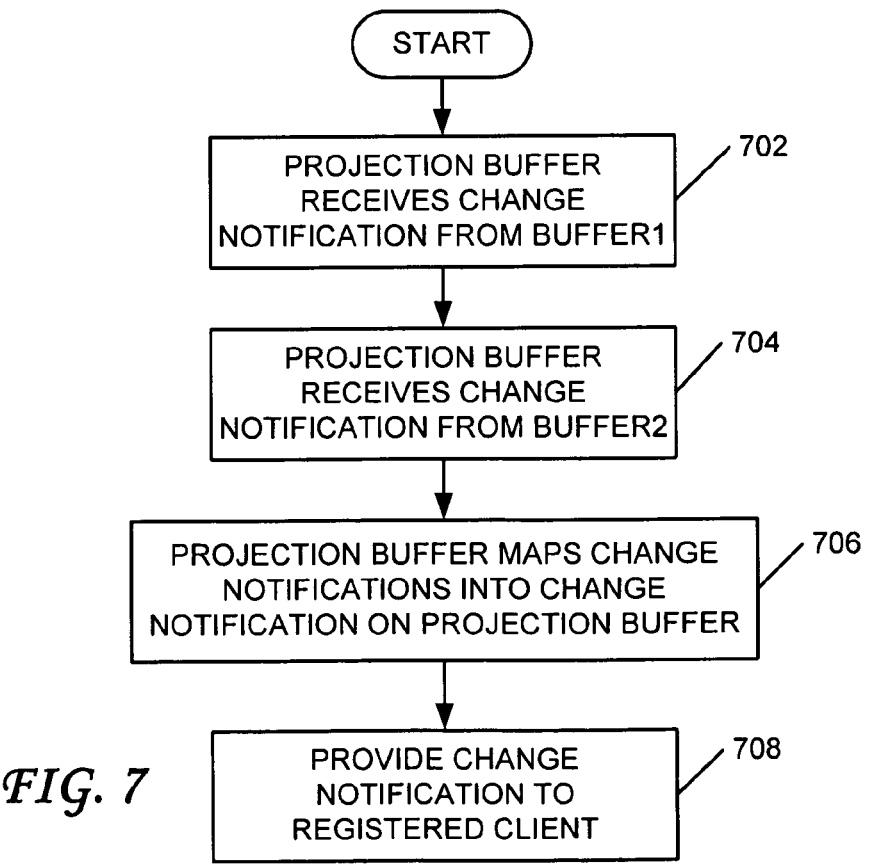
FIG. 7 is a flowchart that illustrates an exemplary process for changing text of a projection buffer and mapping the changed text to corresponding buffers from which the text was projected.

FIG. 6, with reference to an exemplary flowchart of FIG. 7, illustrates an example in which text from source buffers, buffer1 202 and buffer2 204 is changed. The process may begin with projection buffer 206 receiving a change notification from source buffer, buffer1 202, indicating that text at positions 6-7 of buffer1 202 has been changed (act 702). Next, projection buffer 206 may receive a change notification from buffer2 204 indicating that text at positions 2-3 of source buffer, buffer2 204, has been changed (act 704). Projection buffer 206 may map the received change notifications into a change notification on projection buffer 206 (act 706). Projection buffer 206 may then provide the change notification mapped onto projection buffer 206 to a client registered to receive change notifications with respect to projection buffer 206 (act 708).

Projection buffer 206 may further support insertion and deletion of source spans. When a source span is inserted to or deleted from projection buffer 206, projection buffer 206 may issue a change notification to a client registered to receive change notifications with respect to projection buffer 206. For example, with reference to FIG. 2, if a first source span was deleted from projection buffer 206, projection buffer 206 would issue a change notification to the client registered to receive change notifications with respect to projection buffer 206 to inform the registered client that a change occurred with respect to projection buffer 206.

Figure 8:
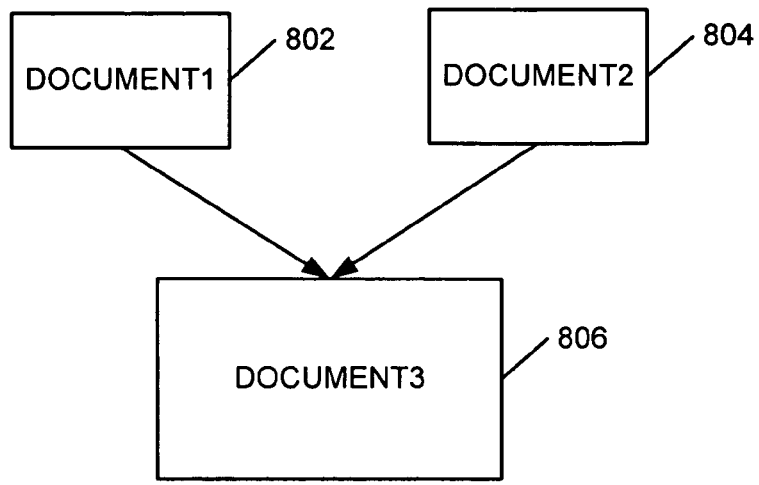
FIG. 8 illustrates an example in which contents of multiple documents are projected to and concatenated in a projection buffer.

FIG. 8 illustrates an example in which multiple documents may be projected and concatenated into a projection buffer. Text buffer 802 may include document1 802. Text buffer 804 may include document2 804. Document1 802 may be projected into projection buffer 806 and document2 804 may be projected into projection buffer 806, such that projection buffer 806 includes a source span for contents of the document1 802 and a source span for contents of document2 804. Thus, after the above-mentioned projections of text buffers 802, 804, projection buffer 806 may appear to an application as if projection buffer 806 includes a concatenation of document1 802 and document2 804. If the contents of text buffer 802 or text buffer 804 are changed, projection buffer 806 will send a notification to a client registered to receive notifications when projection buffer 806 is changed.

The example of FIG. 8 is exemplary. In other embodiments, only one document may be projected onto a projection buffer, numerous documents may be projected onto a projection buffer, only a portion of one or more documents may be projected onto a projection buffer, or any combination of the above may be projected onto a projection.

Figure 9:
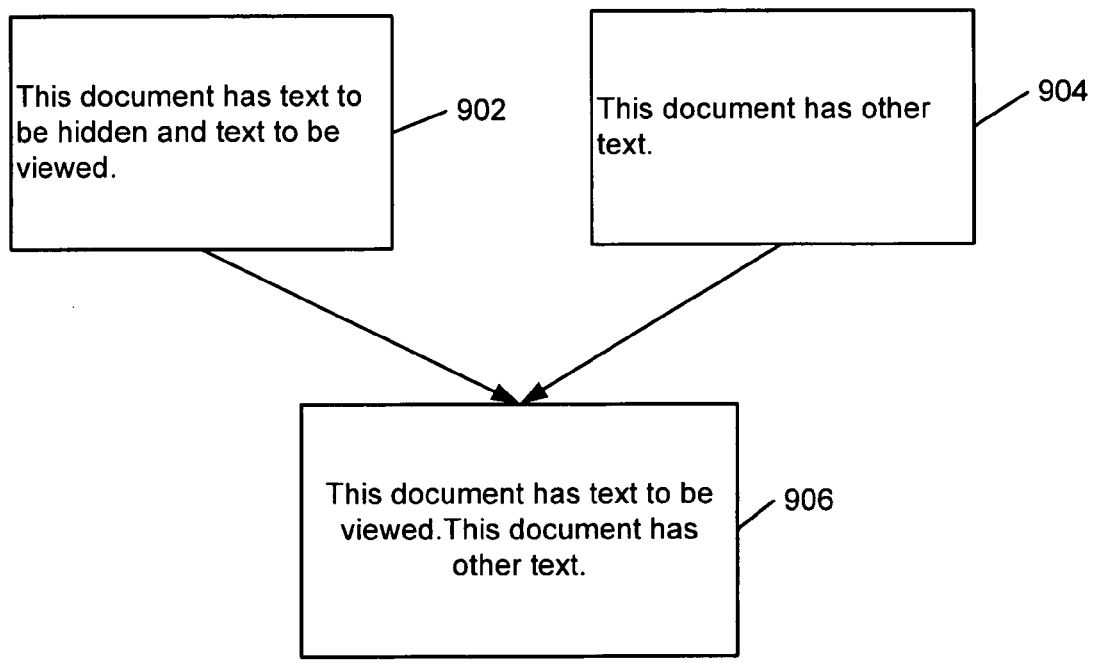
FIG. 9 illustrates an example in which a portion of content of a first buffer and content of a second buffer are projected to a projection buffer.

FIG. 9 illustrates an example in which a portion of a first text buffer may be projected onto a projection buffer and a complete second text buffer may be projected onto the projection buffer. In this example, text buffer 902 may contain text having a portion which is to be hidden and not projected to projection buffer 906. Text buffer 902 may include the text "This document has text to be hidden and text to be viewed." In this example, only a portion of the text of text buffer 902 may be projected to projection buffer 906. For example, three spans may be projected to projection buffer 906. The first span may begin with a first character of text buffer 902 and may extend for a length of 29 characters. Thus, the text "This document has text to be" may be represented by the first span. A second span may begin with a 30th character of text buffer 902 and may extend for a length of seven characters. Thus the second span may represent text "viewed.". The third span projected onto projection buffer 906 may begin with a first character of text buffer 904 and may extend for a length of 29 characters. Thus, the text "This document has other text." may be represented by the third span. Therefore, a client may view a projection buffer 906 as if it contained "This document has text to be viewed. This document has other text."

The example illustrated in FIG. 9 is only exemplary. Of course, other variations of projecting text to a projection buffer may be implemented in other embodiments consistent with the subject matter of this disclosure. For example, in one embodiment, certain regions of text may be elided, under control of a user, from display by an application, such as, for example, an editor or other application, by projecting to a projection buffer only those portions of text that are to be displayed. The application may then display only text represented by the projection buffer, thereby eliding those portions of the text not projected to the projection buffer.

Figure 10A:
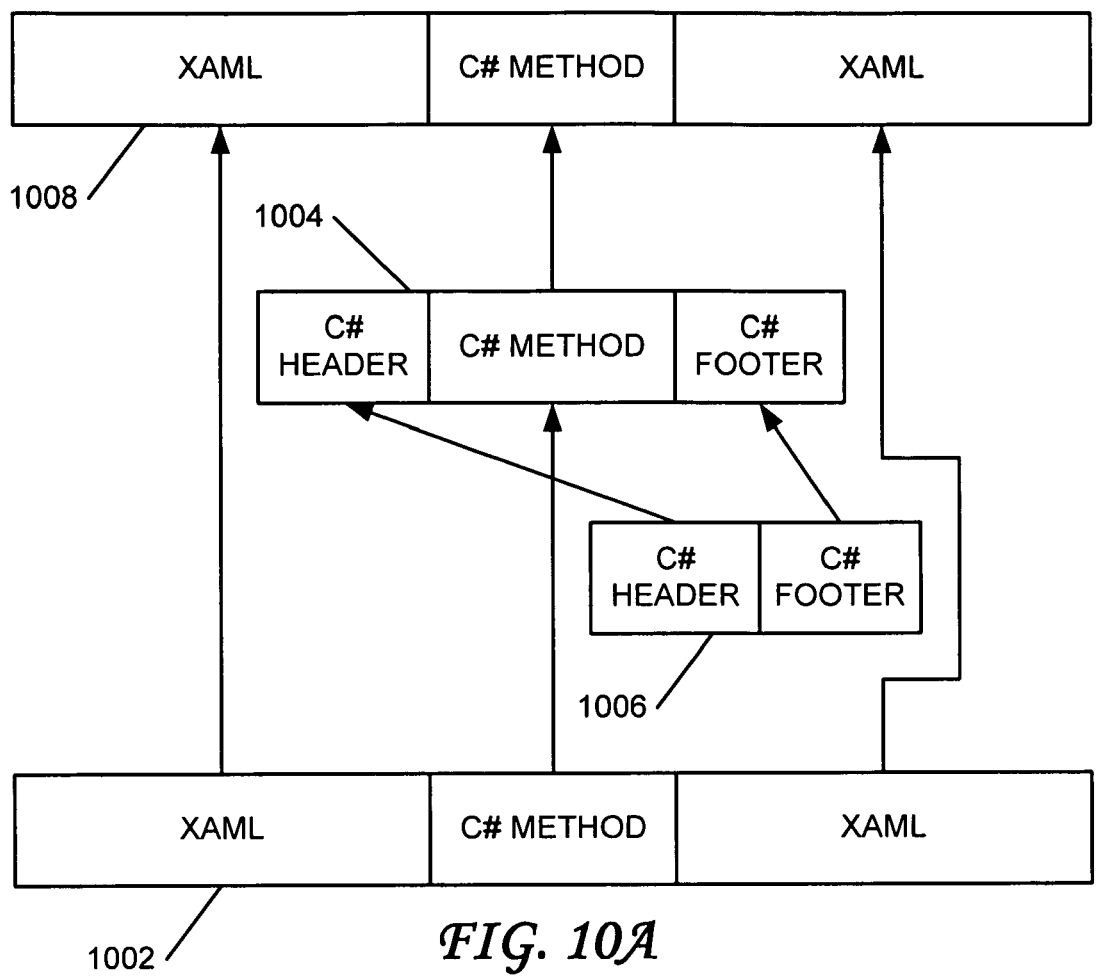
FIGS. 10A and 10B illustrate a complex example in which contents of buffers are projected to multiple projection buffers.

FIG. 10A illustrates a complex example using multiple projection buffers. In this example, text buffer 1002 may include three portions, a first portion having markup language statements, such as, for example, Extensible Application Markup Language (XAML), or other markup language statements, a second portion having a method defined in embedded code, such as, for example, C#, or other programming language, and a third portion having markup language statements, such as, for example, XAML, or other markup language statements. In this example, projection buffer 1008 may be a presentation buffer, used by an application, which may process or display contents of the presentation buffer. A presentation buffer may be a buffer with contents to be presented or rendered by an application. The first and third portions of text buffer 1002 may be projected onto first and third portions of projection buffer 1008. The second portion of text buffer 1002, including the embedded code, may be projected to a second portion of projection buffer 1004, in preparation for providing projection buffer 1004 to an application, such as, for example, a compiler, authoring assistance tools, or another application.

In this example, the compiler, the authoring assistance tools, or the other application may require boilerplate text preceding and following the embedded programming language code. The boilerplate may include metadata, as well as other text data. For example, if the second portion of projection buffer 1004 is C# code, the boilerplate may include namespace and partial class constructs. Text buffer 1006 may have two portions of a boilerplate including a header portion for the embedded programming language code and a footer portion for the embedded programming language code. The header portion of text buffer 1006 may be projected onto a first portion of presentation buffer 1004 and the footer portion of text buffer 1006 may be projected onto a third portion of presentation buffer 1004. The compiler, the authoring assistance tools, or the other application may then process presentation buffer 1004.

In some embodiments, consistent with the subject matter of this disclosure, an application, such as for example, a compiler, authoring assistance tools, or other application may process presentation buffer 1004 and may produce visual adornments, which may be projected onto another buffer, such as text buffer 1002. The visual adornments may be, for example, menu choices, visual aids to aid a user while entering data, pretty printing, or other adornments. A user may then be presented with contents of presentation buffer 1008.

Figure 10B:
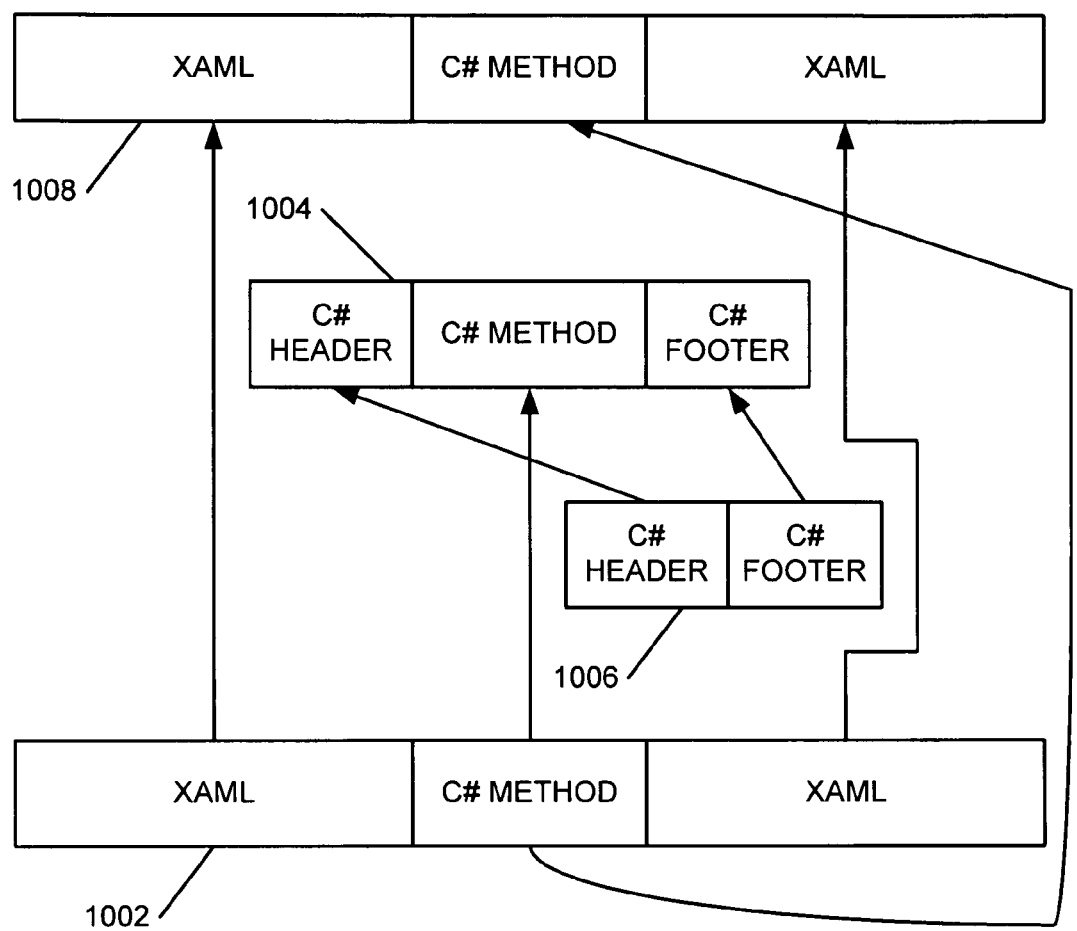

FIG. 10B is a variation of the example presented in FIG. 10A. In this variation, instead of projecting the second portion of projection buffer 1004 to projection buffer 1008, the second portion of projection buffer 1002 may be projected to the second portion of projection buffer 1004 and to the second portion of projection buffer 1008. In other words, a portion of a single source buffer may be projected to multiple projection buffers.

Although not specifically stated in any of the above examples, in some embodiments, no projection buffer may be its own source, directly or indirectly, yielding a directed acyclic graph of buffers

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above descriptions may contain specific details, they should not be construed as limiting the claims in any way. Other configurations of the described embodiments are part of the scope of this disclosure. Further, implementations consistent with the subject matter of this disclosure may have more or fewer acts than as described, or may implement acts in a different order than as shown. Accordingly, the appended claims and their legal equivalents should only define the invention, rather than any specific examples given.

I claim as my invention:

1. A method, implemented on a processing device, for projecting data to a first buffer for use by an application, the method comprising:
   projecting a portion of data from a second buffer to the first buffer the first buffer being a projection buffer;
   projecting a portion of data from a third buffer to the first buffer, as a result of the projecting of the portion of the data from the second buffer and the portion of the data from the third buffer, the first buffer does not include any data projected from the second buffer and the third buffer, but instead includes an ordered list of source spans describing a span of the portion of the second buffer and a span of the portion of the third buffer; and
   providing, to an application, the portions of the data projected to the first buffer, the portion of the data from the second buffer and the portion of the data from the third buffer appearing to the application as if included in the first buffer, wherein
   the method is performed by the processing device.

2. The method of claim 1, wherein a change to the portion of data in the second buffer or to the portion of data in the third buffer is projected to a corresponding portion of data in the first buffer.

3. The method of claim 1, wherein when a change is made to the first buffer and the change includes at least one of the portion of data projected from the second buffer or the portion of data projected from the third buffer, then the change is applied to the at least one of the portion of data of the second buffer or the portion of data of the third buffer.

4. The method of claim 1, further comprising:
   inserting or deleting a source span with respect to the first buffer, the inserted or the deleted source span appearing to the application as if text corresponding to the source span is inserted or deleted, respectively, with respect to the first buffer.

5. The method of claim 1, wherein the portion of the data included in the second buffer includes embedded programming language code, and the method further comprises:
   processing of the embedded programming language code in the second buffer by a development tool to produce an output; and
   providing output produced by the development tool to a buffer other than the second buffer, the output including visual adornments.

6. The method of claim 1, further comprising:
   projecting a portion of data from another buffer to the second buffer.

7. The method of claim 1, wherein the data includes at least one of text or metadata.

8. A processing device comprising:
   at least one processor;
   a memory including instructions for the at least one processor; and
   a bus providing a communication link between the at least one processor and the memory, the memory comprising:
      instructions for projecting at least one portion of a text buffer to a first projection buffer such that a first ordered list of one or more source spans describing one or more spans of the at least one projected portion of the text buffer is included in the first projection buffer and no textual data from the at least one projected portion of the text buffer is included in the first projection buffer,
      instructions for projecting at least one portion of the first projection buffer, including the at least one portion of the text buffer, to a second projection buffer such that a second ordered list of one or more source spans describing one or more spans of the at least one portion of the first projection buffer is included in the second projection buffer and no textual data from the at least a portion of the first projection buffer is included in the second projection buffer; and
      instructions for an application to receive data associated with the second projection buffer.

9. The processing device of claim 8, wherein the at least one portion of the text buffer projected to the first projection buffer appears to a second application as if included in the first projection buffer.

10. The processing device of claim 8, further comprising:
instructions for eliding one or more regions of text from display by an editor, wherein:
the instructions for eliding one or more regions of text from display by an editor comprise instructions for projecting to the first projection buffer only a portion of the text buffer to be accessed by the application, and
the application includes the editor.

11. The processing device of claim 8, wherein a change to any portion of the text buffer that is projected to the first projection buffer and subsequently projected from the first projection buffer to the second projection buffer is reflected in the first projection buffer and the second projection buffer.

12. The processing device of claim 8, wherein:
the memory further comprises instructions for concatenating a plurality of documents such that the concatenated plurality of documents appear to be a single document, and
the instructions for concatenating a plurality of documents further comprise instructions for projecting portions of a plurality of text buffers to the first projection buffer or to the second projection buffer.

13. The processing device of claim 8, wherein the memory further comprises:
instructions for projecting at least one region of text including only embedded language code to the first projection buffer;
instructions for projecting prefix and suffix boilerplate text to a position within the first projection buffer being before and after the embedded language code, respectively; and
instructions for providing data represented by the first projection buffer to a compiler to process the embedded language text.

14. A tangible machine-readable medium having instructions recorded thereon for at least one processor, the tangible machine-readable medium comprising:
instructions for projecting a portion of text data from at least a portion of a source buffer to a plurality of projection buffers such that, as a result of the projecting, the plurality of projection buffers include an ordered list of one or more spans describing the projected portion of the source buffer and do not include the portion of the text data projected; and
instructions for providing at least portions of at least two of the plurality of projection buffers, including the projected portion of text data, to one or more applications.

15. The tangible machine-readable medium of claim 14, wherein no portion of any of the plurality of projection buffers is its own source, directly or indirectly.

16. The tangible machine-readable medium of claim 14, further comprising:
instructions for inserting or deleting source spans with respect to at least one of the plurality of projection buffers, any inserted or deleted source spans with respect to the at least one of the plurality of projection buffers appearing to the one or more applications as if text was inserted or deleted, respectively, with respect to the at least one of the plurality of projection buffers.

17. The tangible machine-readable medium of claim 14, further comprising:
instructions for projecting a portion of a second source buffer including embedded language code in a first language to one of the plurality of projection buffers, other portions of the second source buffer including text other than the embedded language code in the first language;
instructions for providing the one of the plurality of projection buffers to an application for processing;
instructions for projecting output of the application to another one of the plurality of projection buffers, the output including visual adornments.

18. The tangible machine-readable medium of claim 14, further comprising:
instructions for applying changes made to any of the plurality of projection buffers to corresponding portions of source buffers projected to the changed plurality of projection buffers.

19. The tangible machine-readable medium of claim 14, further comprising:
instructions for applying changes made to one or more source buffers to portions of one or more of the plurality of projection buffers to which the changed one or more source buffers are projected.

* * * * *